(12) United States Patent
Sakakibara et al.

(10) Patent No.: US 10,325,362 B2
(45) Date of Patent: Jun. 18, 2019

(54) BOLT AXIAL TENSION MEASURING APPARATUS AND BOLT AXIAL TENSION MEASURING METHOD

(71) Applicant: TOYOTA JIDOSHA KABUSHIKI KAISHA, Toyota-shi (JP)

(72) Inventors: Masahito Sakakibara, Okazaki (JP); Yuichi Hirano, Nisshin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 49 days.

(21) Appl. No.: 15/832,854

(22) Filed: Dec. 6, 2017

(65) Prior Publication Data

US 2018/0165804 A1   Jun. 14, 2018

(30) Foreign Application Priority Data

Dec. 8, 2016 (JP) .................................. 2016-238517

(51) Int. Cl.
*G06T 7/00* (2017.01)
*G01B 9/02* (2006.01)
(Continued)

(52) U.S. Cl.
CPC .............. *G06T 7/0006* (2013.01); *G01B 9/02* (2013.01); *G01B 9/02017* (2013.01); *G01L 5/24* (2013.01); *G06T 7/0004* (2013.01); *G06T 7/20* (2013.01); *G06T 2207/10028* (2013.01); *G06T 2207/30164* (2013.01)

(58) Field of Classification Search
CPC ......... G01B 9/02; G01B 9/02017; G01L 5/24; G06T 2207/10028; G06T 2207/30164; G06T 7/0004; G06T 7/0006; G06T 7/20
See application file for complete search history.

(56) References Cited

U.S. PATENT DOCUMENTS 6,367,366 B1 * 4/2002 Bloom ...................... E21B 4/18
                                                        92/5 R
6,829,944 B1 * 12/2004 Gleman .................... G01L 5/24
                                                        73/761

(Continued)

FOREIGN PATENT DOCUMENTS

JP   2006-308342   11/2006
JP   2011-179952   9/2011
(Continued)

*Primary Examiner* — Jingge Wu
(74) *Attorney, Agent, or Firm* — Oblon, McClelland, Maier & Neustadt, L.L.P.

(57) ABSTRACT

At a first timing when a tightening machine temporarily tightens a bolt, a distance sensor acquires a first distance image. A distance sensor controller measures a first recess amount of the head of the bolt at the first timing by the first distance image. A manipulator controller is configured to change a relative posture of an image sensor relative to the head of the bolt in accordance with a rotation angle by which the bolt is rotated from the first timing to a second timing. The distance sensor acquires a second distance image at the second timing, and the distance sensor controller measures a second recess amount of the head of the bolt at the second timing by the second distance image, so as to measure an axial tension of the bolt by use of a difference between the first recess amount and the second recess amount.

4 Claims, 12 Drawing Sheets

(51) Int. Cl.
*G01L 5/24* (2006.01)
*G06T 7/20* (2017.01)

(56) References Cited

U.S. PATENT DOCUMENTS

| | | | |
|---|---|---|---|
| 7,024,938 B2 * | 4/2006 | Gleman | F16B 31/02 |
| | | | 73/761 |
| 2002/0148299 A1 * | 10/2002 | Leong | B23P 19/042 |
| | | | 73/761 |
| 2010/0208904 A1 * | 8/2010 | Nakajima | H04R 1/406 |
| | | | 381/58 |
| 2013/0068031 A1 * | 3/2013 | Mekid | F16B 31/02 |
| | | | 73/761 |
| 2016/0267645 A1 * | 9/2016 | Nakamura | G01L 5/0038 |
| 2018/0067003 A1 * | 3/2018 | Michiwaki | G01L 1/22 |
| 2018/0073542 A1 * | 3/2018 | Saigo | F16B 31/02 |

FOREIGN PATENT DOCUMENTS

| | | |
|---|---|---|
| JP | 2015-81798 | 4/2015 |
| JP | 2015-215343 | 12/2015 |

* cited by examiner

AXIAL TENSION CONVERSION CURVE

BOLT AXIAL TENSION MEASURING APPARATUS AND BOLT AXIAL TENSION MEASURING METHOD

INCORPORATION BY REFERENCE

The disclosure of Japanese Patent Application No. 2016-238517 filed on Dec. 8, 2016 including the specification, drawings and abstract is incorporated herein by reference in its entirety.

BACKGROUND

1. Technical Field

This disclosure relates to a bolt axial tension measuring apparatus and a bolt axial tension measuring method, and particularly, a bolt axial tension measuring apparatus and a bolt axial tension measuring method each for measuring an axial tension of a bolt tighten to a to-be-tightened member.

2. Description of Related Art

For the purpose of checking a tightening state of a bolt, and the like purposes, an axial tension of a bolt tightened to a to-be-tightened member is measured. The axial tension of the bolt is correlated with a displacement amount of a head of the bolt (that is, a difference between recess amounts of the head of the bolt before and after the tightening). On this account, as the measurement of the axial tension, a correlation between the axial tension and the displacement amount of the head is acquired in advance, the displacement amount of the head is measured at the time when the axial tension is actually measured, and the axial tension is measured based on the correlation.

In relation to the technique, for example, Japanese Patent Application Publication No. 2015-081798 (JP 2015-081798 A) discloses an axial tension measuring method in which a height of a head of a bolt is measured by a distance sensor so as to acquire a distance image in which the height is indicated by a pixel value, a displacement amount of the head is calculated by use of the distance image thus acquired, and the displacement amount is substituted into a relational expression calculated in advance in terms of an axial tension and a displacement amount of the head, so as to obtain an axial tension. In the axial tension measuring method according to JP 2015-081798 A, a hollow amount (a recess amount) of the head of the bolt is calculated by use of a distance image of the head before tightening of the bolt and a hollow amount (a recess amount) of the head of the bolt is calculated by use of a distance image of the head after the tightening of the bolt, so as to calculate a difference between the hollow amounts before and after the tightening. Thus, the displacement amount of the head is calculated.

SUMMARY

When the bolt is tightened, the head of the bolt rotates from a state before the tightening. Accordingly, the distance image of the head before the tightening and the distance image of the head after the tightening have different orientations of the head. As such, when the displacement amount of the head is calculated from the recess amounts calculated by use of the distance images having different orientations of the head before and after the tightening, the displacement amount cannot be calculated accurately, which accordingly might not be able to measure the axial tension accurately. In the meantime, the technique in JP 2015-081798 A does not take such a possibility into consideration.

This disclosure provides a bolt axial tension measuring apparatus and a bolt axial tension measuring method each of which is able to measure an axial tension of a bolt accurately.

A bolt axial tension measuring apparatus according to this disclosure is a bolt axial tension measuring apparatus for measuring an axial tension of a bolt tightened to a to-be-tightened member. The bolt axial tension measuring apparatus includes: a tightening machine configured to threadedly engage the bolt with the to-be-tightened member, so as to tighten the bolt to the to-be-tightened member; a distance sensor configured to measure a distance to a head of the bolt and to acquire a distance image in which the distance thus measured is indicated by a pixel value; a controlling portion configured to control a relative posture of an image sensor of the distance sensor relative to the head of the bolt; and a measuring portion configured to measure a recess amount of the head of the bolt by use of the distance image so as to measure an axial tension of the bolt. At a first timing when the tightening machine temporarily tightens the bolt, the distance sensor is configured to acquire a first distance image and the measuring portion is configured to measure a first recess amount of the head of the bolt at the first timing by use of the first distance image. The controlling portion is configured to change the relative posture of the image sensor relative to the head of the bolt in accordance with a rotation angle by which the bolt is rotated from the first timing to a second timing when the tightening machine further tightens the bolt as compared to the first timing. At the second timing, the distance sensor is configured to acquire a second distance image and the measuring portion is configured to measure a second recess amount of the head of the bolt at the second timing by use of the second distance image, so as to measure the axial tension of the bolt by use of a difference between the first recess amount and the second recess amount.

Further, a bolt axial tension measuring method according to this disclosure is a bolt axial tension measuring method for measuring an axial tension of a bolt tightened to a to-be-tightened member. The bolt axial tension measuring method includes: measuring a first recess amount of a head of the bolt at a first timing by use of a first distance image acquired at the first timing by a distance sensor configured to measure a distance to the head of the bolt so as to acquire a distance image in which the distance thus measured is indicated by a pixel value, the first timing being a timing when a tightening machine temporarily tightens the bolt, the tightening machine being configured to threadedly engage the bolt to the to-be-tightened member so as to tighten the bolt to the to-be-tightened member; changing a relative posture of an image sensor of the distance sensor relative to the head of the bolt in accordance with a rotation angle by which the bolt is rotated from the first timing to a second timing when the tightening machine further tightens the bolt as compared to the first timing; measuring a second recess amount of the head of the bolt at the second timing by use of a second distance image acquired by the distance sensor at the second timing; and measuring the axial tension of the bolt by use of a difference between the first recess amount and the second recess amount.

Since the disclosure is configured as such, respective postures of images corresponding to the head of the bolt, illustrated in respective distance images at the first timing and the second timing can be made the same. Accordingly, the bolt axial tension measuring apparatus according to the above configuration can accurately calculate a displacement amount (a difference between the recess amount at the first timing and the recess amount at the second timing) of the head of the bolt by the axial tension, so that the axial tension of the bolt can be measured accurately.

Further, the second timing may be a timing of final tightening of the bolt. At the first timing, the tightening machine may be configured to tighten the bolt with a first torque corresponding to the temporary tightening of the bolt, and then retreat from a position opposed to the bolt, and the controlling portion may be configured to control a posture of the distance sensor so that the image sensor is opposed to the head of the bolt. At the second timing, the tightening machine may be configured to tighten the bolt with a second torque corresponding to the final tightening of the bolt, and then retreat from the position opposed to the bolt, and the controlling portion may be configured to control the posture of the distance sensor so that the image sensor is opposed to the head of the bolt. Since the disclosure is configured as such, it is possible to automatically measure the axial tension of the bolt after the final tightening.

Further, the controlling portion may be configured to rotate the image sensor relative to the head of the bolt or to rotate, relative to the image sensor, the to-be-tightened member to which the bolt is tightened, by the same angle as the rotation angle by which the bolt rotates from the first timing to the second timing. Since the disclosure is configured as such, it becomes unnecessary to rotate the distance image at the time of measuring a recess amount of the head of the bolt at the second timing. This makes it possible to simplify the process of measuring the axial tension.

According to the disclosure, it is possible to provide a bolt axial tension measuring apparatus and a bolt axial tension measuring method each of which is able to measure an axial tension of a bolt accurately.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

With reference to drawings, the following describes an embodiment of this disclosure. However, the disclosure is not limited to the following embodiment. Further, the following description and drawings are simplified appropriately for clarification of the description.

Embodiment 1

Figure 1:
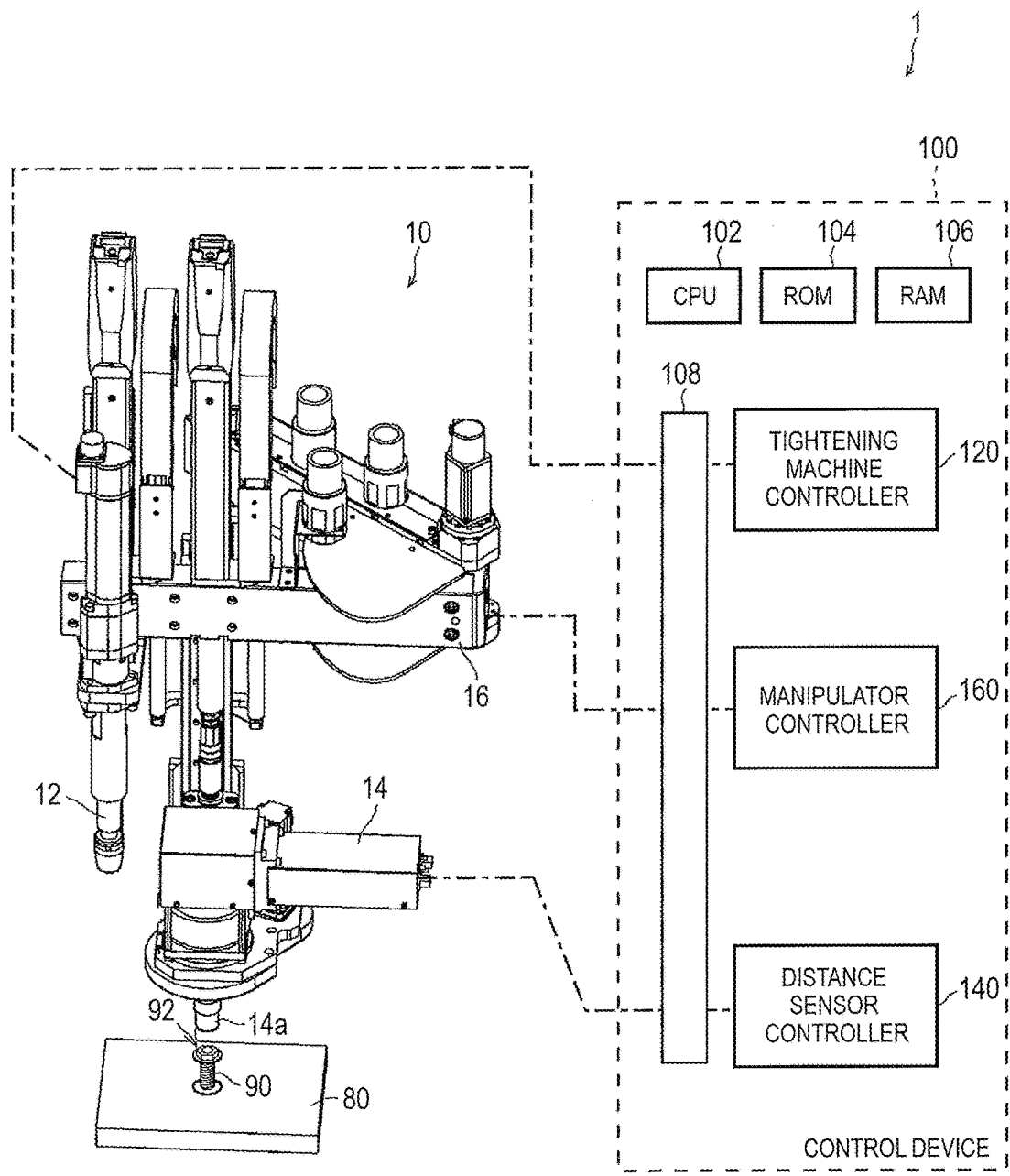
FIG. 1 is a view illustrating a bolt axial tension measuring apparatus according to Embodiment 1.

FIG. 1 is a view illustrating a bolt axial tension measuring apparatus 1 according to Embodiment 1. The bolt axial tension measuring apparatus 1 includes an operation robot 10 and a control device 100. The operation robot 10 operates by control of the control device 100. The operation robot 10 includes a tightening machine 12, a distance sensor 14, and a manipulator 16.

The tightening machine 12 is a nut runner, for example. The tightening machine 12 tightens a bolt 90 by control of the control device 100. The tightening machine 12 threadedly engages the bolt 90 with a to-be-tightened member 80, so as to tighten the bolt 90 to the to-be-tightened member 80. Details thereof will be described later. Note that the to-be-tightened member 80 includes a nut and the like.

The distance sensor 14 is a distance sensor or a three-dimensional camera, for example. The distance sensor 14 measures a distance to a head 92 of the bolt 90 tightened to the to-be-tightened member 80 by control of the control device 100. Then, the distance sensor 14 acquires data (hereinafter just referred to as a "distance image") indicative of a distance image in which a distance is indicated by a pixel value, and outputs the distance image to the control device 100. Details thereof will be described later.

The manipulator 16 operates the tightening machine 12 and the distance sensor 14 by control of the control device 100. For example, the manipulator 16 moves the tightening machine 12 so that the tightening machine 12 is opposed to the head 92 of the bolt 90. Further, the manipulator 16 moves the distance sensor 14 so that an image sensor 14a of the distance sensor 14 is opposed to the head 92 of the bolt 90. A specific operation of the manipulator 16 will be described later.

The control device 100 is a computer, for example. As main hardware constituents, the control device 100 includes a CPU (Central Processing Unit) 102, a ROM (Read Only Memory) 104, a RAM (Random Access Memory) 106, and an interface portion 108 (IF; Interface). The CPU 102, the ROM 104, the RAM 106, and the interface portion 108 are connected to each other via data buses and the like.

The CPU 102 has a function as a computing unit for performing a control process, a computing process, and the like. The ROM 104 has a function to store a control program, a computing program, and the like executed by the CPU 102. The RAM 106 has a function to store process data and the like temporarily. The interface portion 108 inputs/outputs a signal to/from outside by wired communication or wireless communication.

Further, the control device 100 includes a tightening machine controller 120, a distance sensor controller 140, and a manipulator controller 160. The tightening machine controller 120, the distance sensor controller 140, and the manipulator controller 160 can be realized such that the CPU 102 executes programs stored in the ROM 104, for example. Further, a necessary program may be stored in a given nonvolatile recording medium and installed as needed, so that the tightening machine controller 120, the distance sensor controller 140, and the manipulator controller 160 may be realized.

Further, the programs can be stored by use of various types of non-transitory computer readable media and supplied to the computer. The non-transitory computer readable media include various types of tangible storage media. Exemplary non-transitory computer readable media include a magnetic storage medium (e.g., a flexible disk, a magnetic tape, a hard disk drive), an optomagnetic recording medium (e.g., an MO disk), a CD-ROM, a CD-R, a CD-R/W, and a semiconductor memory (e.g., a mask ROM, a PROM (Programmable ROM), an EPROM (Erasable PROM), a flash ROM, a RAM). Further, the programs can be supplied to the computer by various types of transitory computer readable media. Exemplary transitory computer readable media include an electrical signal, an optical signal, and an electromagnetic wave. The transitory computer readable media can supply the programs to the computer through a wired communication channel such as a cable and an optical fiber or a wireless communication channel.

Note that the tightening machine controller 120, the distance sensor controller 140, and the manipulator controller 160 are not limited to being implemented by software as described above, and may be implemented by hardware such as some sort of a circuit element. Further, the tightening machine controller 120, the distance sensor controller 140, and the manipulator controller 160 may not be necessarily provided in one device physically, and may be configured separately as hardware. In this case, the tightening machine controller 120, the distance sensor controller 140, and the manipulator controller 160 may function as respective computers.

Figure 6:
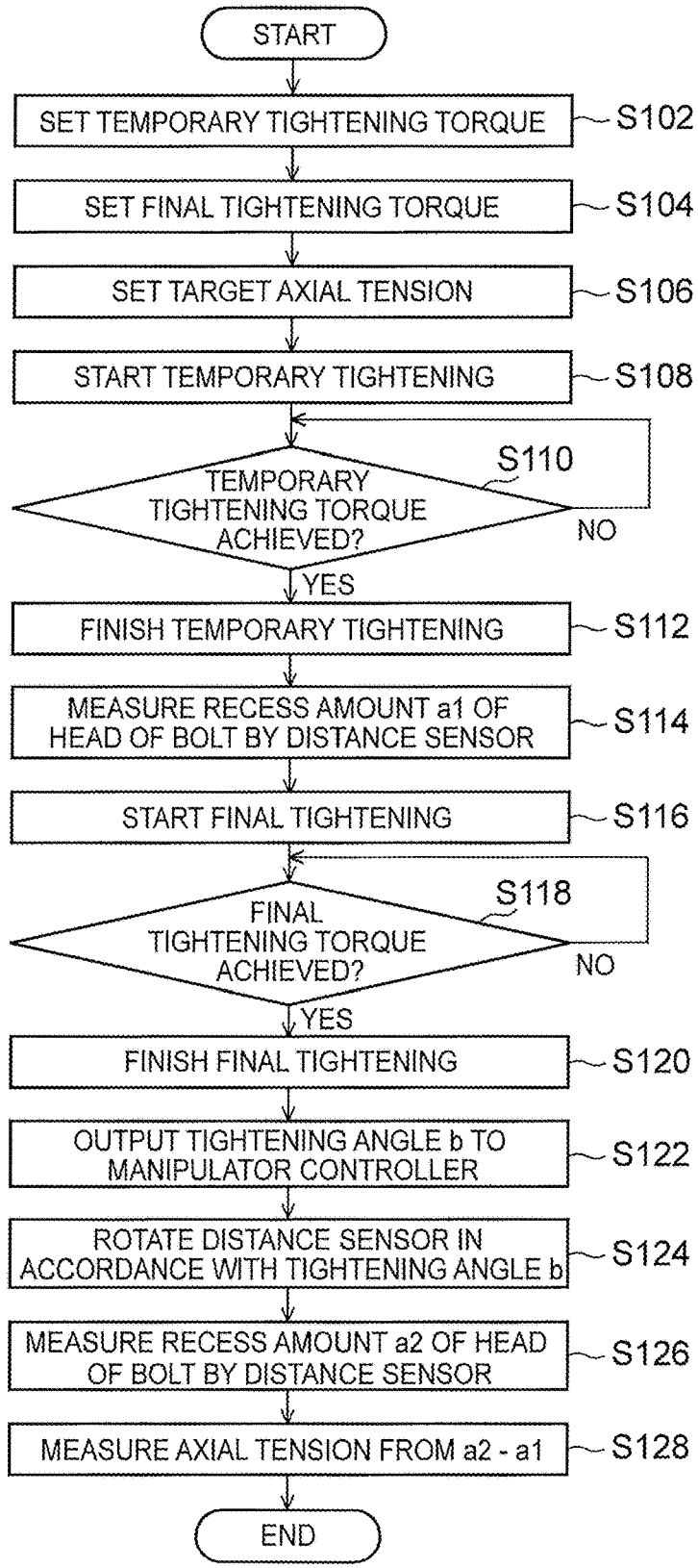
FIG. 6 is a flowchart illustrating a bolt axial tension measuring method to be performed by use of the bolt axial tension measuring apparatus according to Embodiment 1.

Further, the control device 100 stores teaching data for the operation robot 10 to perform a series of working steps. The teaching data is data to perform a series of working steps, e.g., tightening of the bolt 90 to the to-be-tightened member 80, and acquiring of a distance image of the head 92 of the bolt 90, as illustrated in FIG. 6 (described later). The tightening machine controller 120, the distance sensor controller 140, and the manipulator controller 160 control the tightening machine 12, the distance sensor 14, and the manipulator 16 according to the teaching data, respectively. Further, the teaching data stores respective positions of the tightening machine 12 and the distance sensor 14 to be controlled in each step, and the manipulator controller 160 controls the tightening machine 12 and the distance sensor 14 to move to the positions indicated by the teaching data.

The tightening machine controller 120 controls the tightening machine 12. Further, the tightening machine controller 120 acquires an angle (a tightening angle) by which the bolt 90 is rotated at the time when the tightening machine 12 tightens the bolt 90. The distance sensor controller 140 calculates a recess amount of the bolt 90 by use of a distance image, and measures an axial tension of the bolt 90 tightened to the to-be-tightened member 80. That is, the distance sensor controller 140 has a function as a measuring portion. Further, the manipulator controller 160 controls the manipulator 16 and controls operations of the tightening machine 12 and the distance sensor 14. That is, the manipulator controller 160 (and the manipulator controller 160 and the manipulator 16) has a function as a controlling portion.

Figure 2:
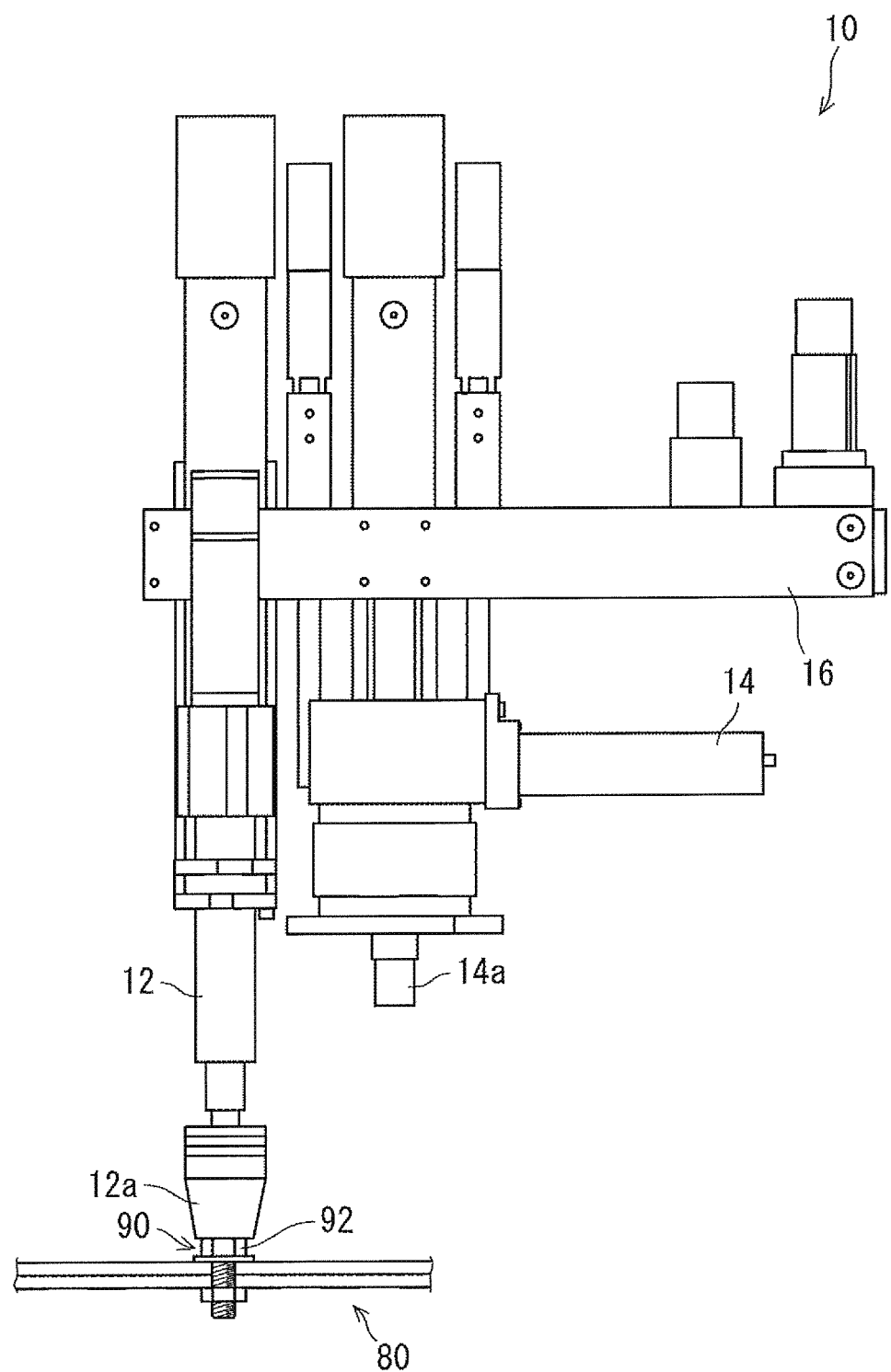
FIG. 2 is a view illustrating a state where a tightening machine according to Embodiment 1 tightens a bolt.

FIG. 2 is a view illustrating a state where the tightening machine 12 according to Embodiment 1 tightens the bolt 90. At a timing to tighten the bolt 90, as illustrated in FIG. 2, the manipulator 16 moves the tightening machine 12 by control of the manipulator controller 160, so that a tip end 12*a* of the tightening machine 12 is opposed to the head 92 of the bolt 90. Then, the tightening machine 12 moves the tip end 12*a* having a socket shape downward by control of the tightening machine controller 120 so as to insert the head 92 into the tip end 12*a*. Hereby, the tip end 12*a* is engaged with the head 92. Then, the tightening machine 12 rotates the tip end 12*a*. Hereby, the bolt 90 is threadedly engaged with the to-be-tightened member 80. Note that the tip end 12*a* may not have a socket shape. In a case where the bolt 90 is a hexagon socket head bolt, the tip end 12*a* may have a hexagonal-bar-wrench shape. In that case, the tip end 12*a* is inserted into a hexagon socket formed in the head 92 and then rotated, so that the bolt 90 is threadedly engaged with the to-be-tightened member 80.

Figure 3:
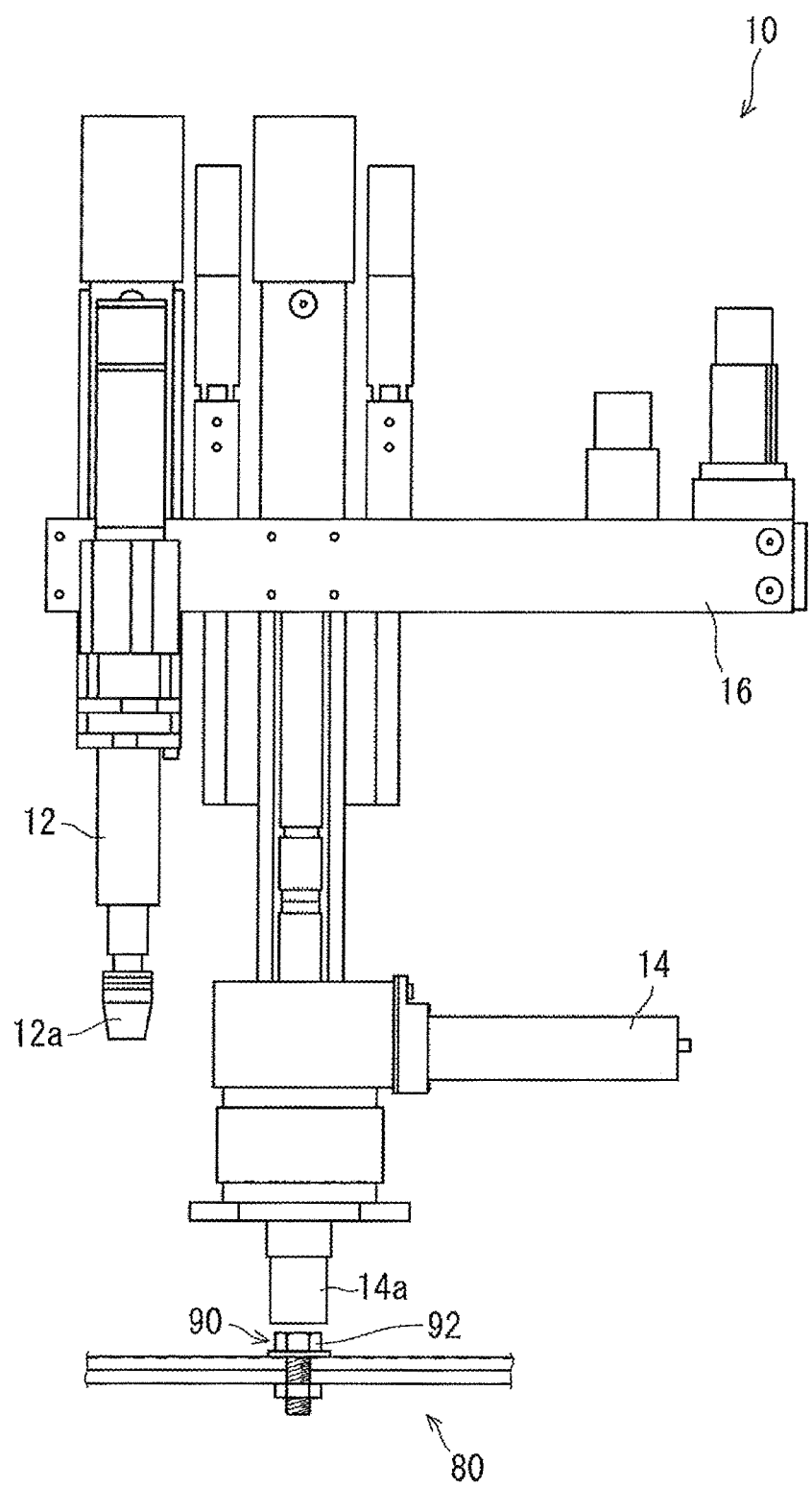
FIG. 3 is a view illustrating a state where a distance sensor according to Embodiment 1 measures a distance to a head of the bolt.

FIG. 3 is a view illustrating a state where the distance sensor 14 according to Embodiment 1 measures a distance to the head 92 of the bolt 90. As illustrated in FIG. 3, at a timing of measurement of the distance to the head 92 of the bolt 90, the manipulator 16 moves the distance sensor 14 by control of the manipulator controller 160, so that the image sensor 14*a* of the distance sensor 14 is opposed to the head 92 of the bolt 90. The distance sensor 14 measures the distance to the head 92 of the bolt 90 by control of the distance sensor controller 140, so as to generate a distance image corresponding to a top surface of the head 92 of the bolt 90. The distance sensor controller 140 acquires the distance image thus generated from the distance sensor 14.

Figure 4:
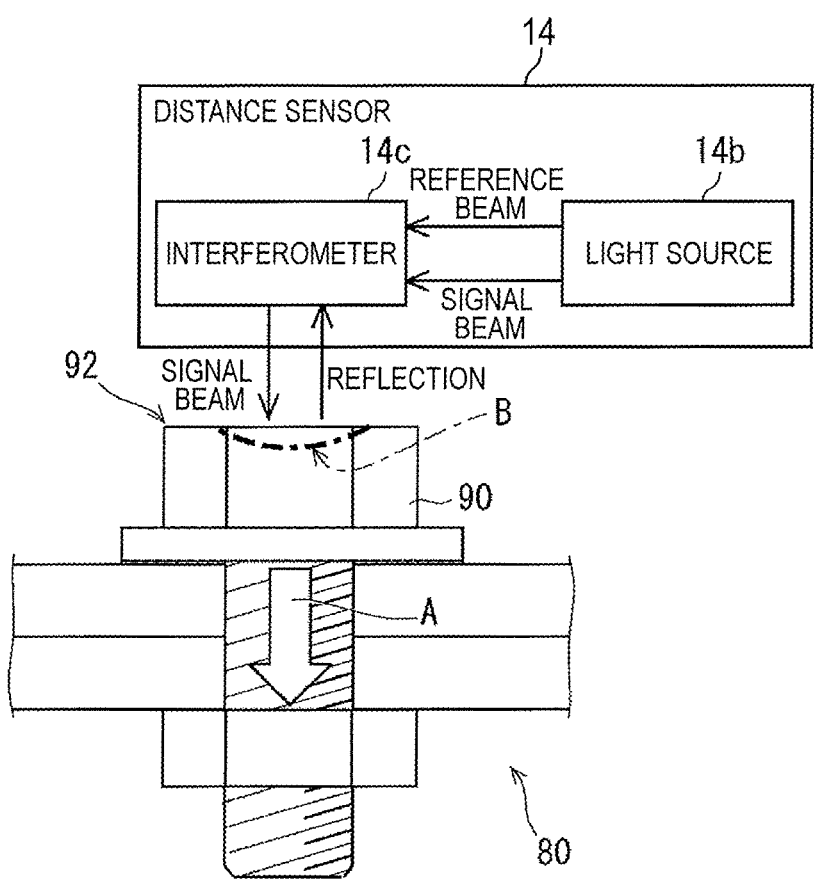
FIG. 4 is a view to describe a measuring method of an axial tension.

FIG. 4 is a view to describe a measuring method of an axial tension. The distance sensor 14 illustrated in FIG. 4 uses optical comb interference, but is not limited to this. When the bolt 90 is tightened, an axial tension is generated in the bolt 90 as indicated by an arrow A. Due to the axial tension, the top surface of the head 92 of the bolt 90 deforms to be hollowed like an alternate long and short dash line indicated by an arrow B. The axial tension of the bolt 90 and a deformation amount of the head 92 have a correlation with each other. Accordingly, by calculating a deformation amount of the head 92 of the bolt 90 before and after the tightening of the bolt 90, it is possible to measure the axial tension of the bolt 90.

More specifically, the distance sensor 14 acquires distance images of the head 92 of the bolt 90 before the tightening of the bolt 90 and after the tightening thereof. The distance sensor 14 includes a light source 14*b* and an interferometer 14*c*, for example. Note that the interferometer 14*c* may be integrated with the image sensor 14*a*.

The light source 14b supplies, to the interferometer 14c, a reference beam and a signal beam, which are laser beams. The interferometer 14c applies the signal beam to the head 92 of the bolt 90. The interferometer 14c receives reflection of the signal beam from the head 92. The interferometer 14c acquires, as a reference signal, a signal obtained by interfering a signal beam that is not applied to the head 92 with the reference beam. Further, the interferometer 14c acquires, as a measurement signal, a signal obtained by interfering the reflection beam with the reference beam. The distance sensor 14 measures a distance to the position of the head 92 to which the signal beam is applied by use of a difference (a phase difference, a time difference, and the like) between the reference signal and the measurement signal. Further, the interferometer 14c scans the signal beam over the top surface of the head 92 by use of a galvanometer mirror and the like, so that the distance sensor 14 can measure a distance at each position on the top surface of the head 92. Then, the distance sensor 14 generates a distance image in which each pixel corresponds to each position and a pixel value of the each pixel indicates a distance to the each position. Note that the distance sensor controller 140 may generate the distance image.

As will be described later, the distance sensor controller 140 calculates a difference in height (a recess amount) on the top surface of the head 92 of the bolt 90 by use of distance images of the bolt 90 before and after the tightening. Note that, in a case where the top surface of the head 92 of the bolt 90 has little recess, the recess amount before the tightening of the bolt 90 can be substantially zero. Further, in a case where the bolt 90 is a bolt having such a shape that a central part of the top surface of the head 92 projects, the recess amount can be a negative value. The distance sensor controller 140 calculates a difference between a recess amount before the tightening and a recess amount after the tightening as a displacement amount (a deformation amount). The distance sensor controller 140 measures an axial tension of the bolt 90 by use of an axial tension conversion curve exemplified below, for example, and the displacement amount.

Figure 5:
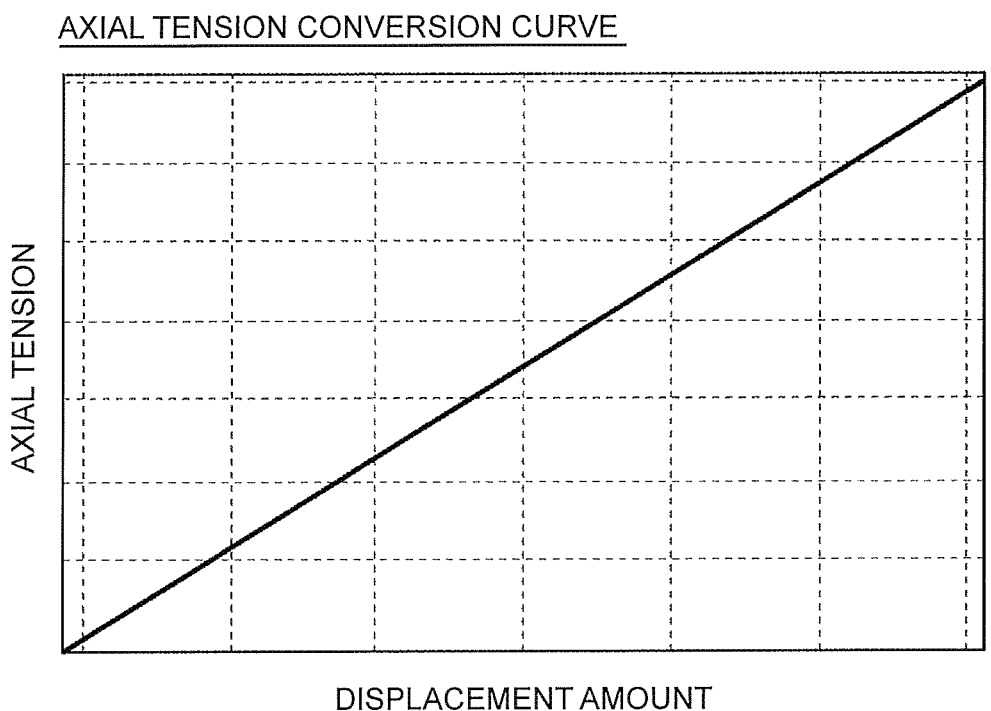
FIG. 5 is a view exemplifying an axial tension conversion curve.

FIG. 5 is a view exemplifying the axial tension conversion curve. The axial tension conversion curve is a graph with a horizontal axis indicative of the displacement amount and a vertical axis indicative of the axial tension. The control device 100 stores the axial tension conversion curve therein. Note that the axial tension conversion curve can be generated, for example, by the following method. Axial tensions obtained at the time when bolts of the same specification are tightened with various tightening torques are measured in advance by use of a tension tester, a load cell, or the like. Further, displacement amounts of respective heads of those bolts at this time are calculated by use of the distance sensor. A plurality of points each indicating a corresponding displacement amount and a corresponding axial tension are plotted, so as to obtain an approximate curve (or an approximate straight line) of those points as the axial tension conversion curve. Note that the control device 100 can store a plurality of different axial tension conversion curves for respective types of the bolts 90. Note that the axial tension conversion curve may be a straight line. Accordingly, the "curve" as used herein is a concept also including a straight line.

FIG. 6 is a flowchart illustrating a bolt axial tension measuring method performed by use of the bolt axial tension measuring apparatus 1 according to Embodiment 1. First, the control device 100 sets a temporary tightening (seating) torque (a first torque) (step S102), sets a final tightening (target) torque (a second torque) (step S104), and sets a target axial tension (step S106). The temporary tightening torque is around 1 to 5 Nm, for example, but is not limited to this. Further, the final tightening torque is around 50 to 110 Nm, for example, but is not limited to this. Note that the target axial tension may not necessarily be set.

Then, the bolt axial tension measuring apparatus 1 starts temporary tightening of the bolt 90 (step S108). More specifically, a temporary tightening start command is output by pressing of a button provided in the control device 100 or the like, or by an external signal and the like. When the temporary tightening start command is output, the manipulator controller 160 of the control device 100 causes the tightening machine 12 to be opposed to the head 92 of the bolt 90 in accordance with teaching data. By control of the tightening machine controller 120, the tightening machine 12 tightens the bolt 90 to the to-be-tightened member 80 with the set temporary tightening torque.

When a tightening torque reaches the temporary tightening torque (YES in step S110), the tightening machine controller 120 stops the tightening machine 12 and finishes the temporary tightening operation (step S112). At this time, an axial tension is hardly applied to the bolt 90 (that is, the axial tension is generally zero). Further, the tightening machine controller 120 outputs, to the manipulator controller 160, a temporary tightening end signal indicating that the temporary tightening operation has been finished. At a timing (a first timing) when the temporary tightening is finished, the bolt axial tension measuring apparatus 1 measures a recess amount of the head 92 of the bolt 90 by use of the distance sensor 14 (step S114).

Figure 7:
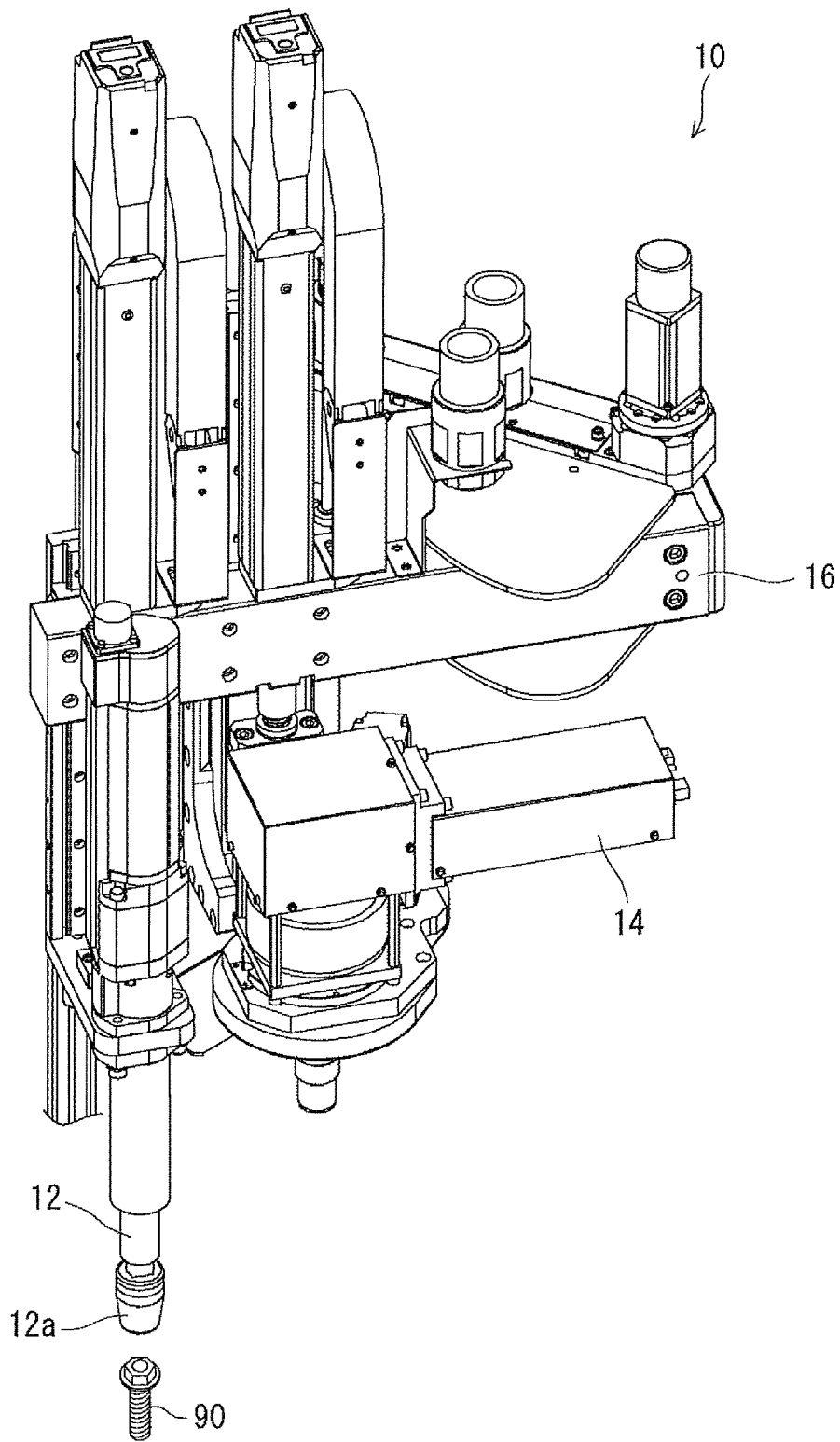
FIG. 7 is a view to describe an operation of a manipulator at a timing when temporary tightening is finished.
Figure 8:
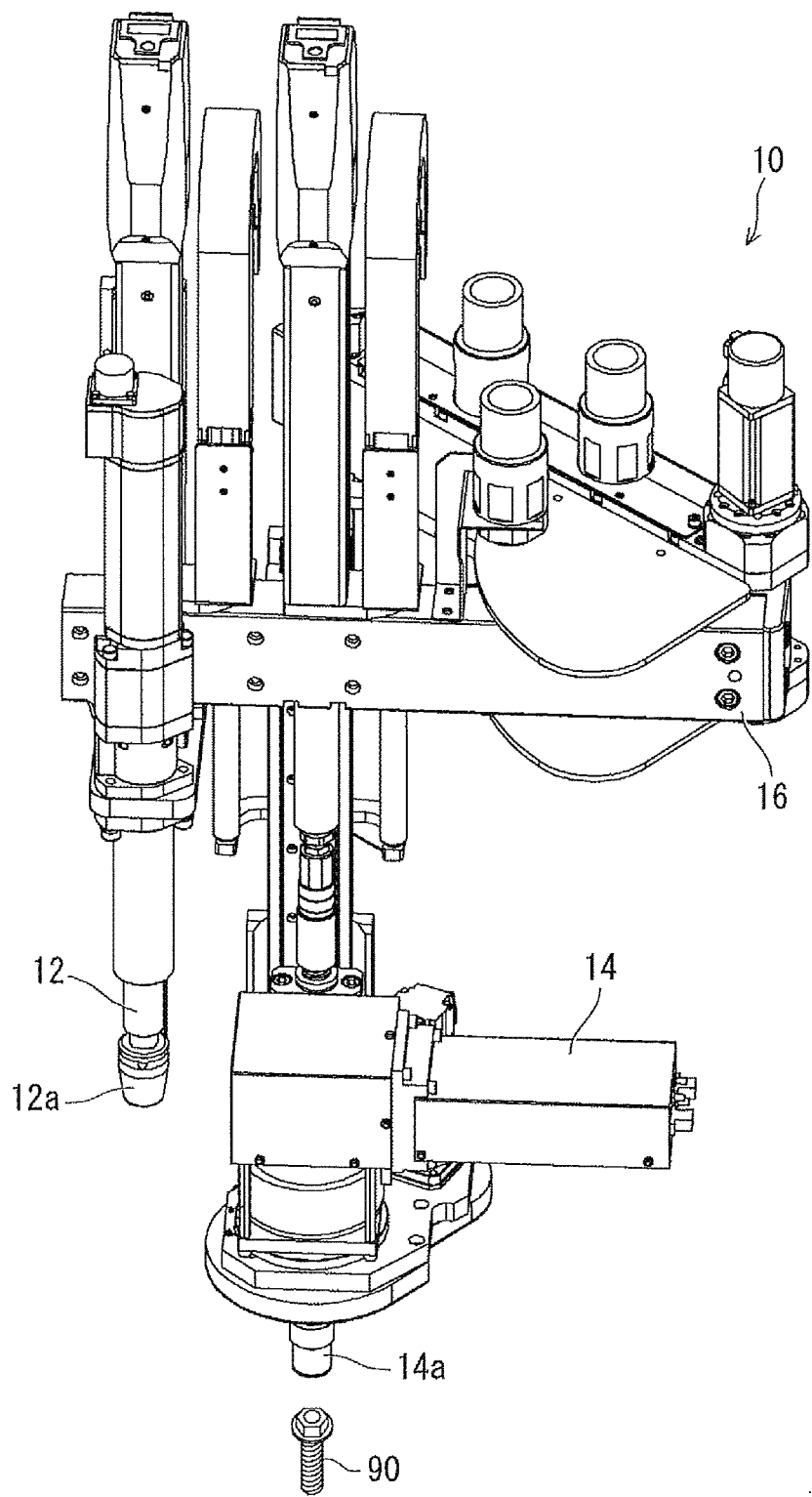
FIG. 8 is a view to describe the operation of the manipulator at the timing when the temporary tightening is finished.

FIGS. 7 and 8 are views to describe the operation of the manipulator 16 at the timing when the temporary tightening is finished. As illustrated in FIG. 7, at the time when the temporary tightening is finished, the tip end 12a of the tightening machine 12 is opposed to the head 92 of the bolt 90. When the manipulator controller 160 receives the temporary tightening end signal, the manipulator controller 160 retreats the tightening machine 12 from a position opposed to the head 92 of the bolt 90, and controls the manipulator 16 so that the image sensor 14a of the distance sensor 14 is opposed to the head 92 of the bolt 90. Hereby, as illustrated in FIG. 8, the distance sensor 14 is set above the head 92 of the bolt 90. When the distance sensor 14 is set to a state illustrated in FIG. 8, the manipulator controller 160 outputs a set completion signal to the distance sensor controller 140.

When the distance sensor controller 140 receives the set completion signal, the distance sensor controller 140 controls the distance sensor 14 to generate a distance image of the head 92 at a timing when the temporary tightening is finished. Hereby, the distance sensor controller 140 acquires the distance image (a first distance image) of the head 92 at the timing when the temporary tightening is finished. Further, the distance sensor controller 140 measures a recess amount a1 (a first recess amount) of the head 92 at the timing when the temporary tightening is finished, as will be described later.

Then, the bolt axial tension measuring apparatus 1 starts final tightening of the bolt 90 (step S116). More specifically, when the distance sensor controller 140 measures the recess amount a1, the distance sensor controller 140 outputs a measurement completion signal to the manipulator controller 160. When the manipulator controller 160 receives the measurement completion signal, the manipulator controller 160 controls the manipulator 16 so that the distance sensor 14 retreats from the position opposed to the head 92 of the bolt 90 and the tip end 12a of the tightening machine 12 is opposed to the head 92 of the bolt 90. Hereby, as illustrated in FIG. 7, the tightening machine 12 is set above the head 92 of the bolt 90. When the tightening machine 12 is set to a state illustrated in FIG. 7, the manipulator controller 160 outputs a set completion signal to the tightening machine controller 120. By control of the tightening machine controller 120, the tightening machine 12 tightens the bolt 90 with the set final tightening torque.

When a tightening torque reaches the final tightening torque (YES in step S118), the tightening machine controller 120 stops the tightening machine 12 and finishes the final tightening operation (step S120). Further, the tightening machine controller 120 outputs, to the manipulator controller 160, a final tightening end signal indicating that the final tightening operation has been finished. Further, the tightening machine controller 120 acquires, as a tightening angle b, a rotation angle by which the head 92 of the bolt 90 rotates from the timing (the first timing) of the temporary tightening end to the timing (the second timing) of the final tightening end. Then, the tightening machine controller 120 outputs the tightening angle b to the manipulator controller 160 (step S122).

Figure 9:
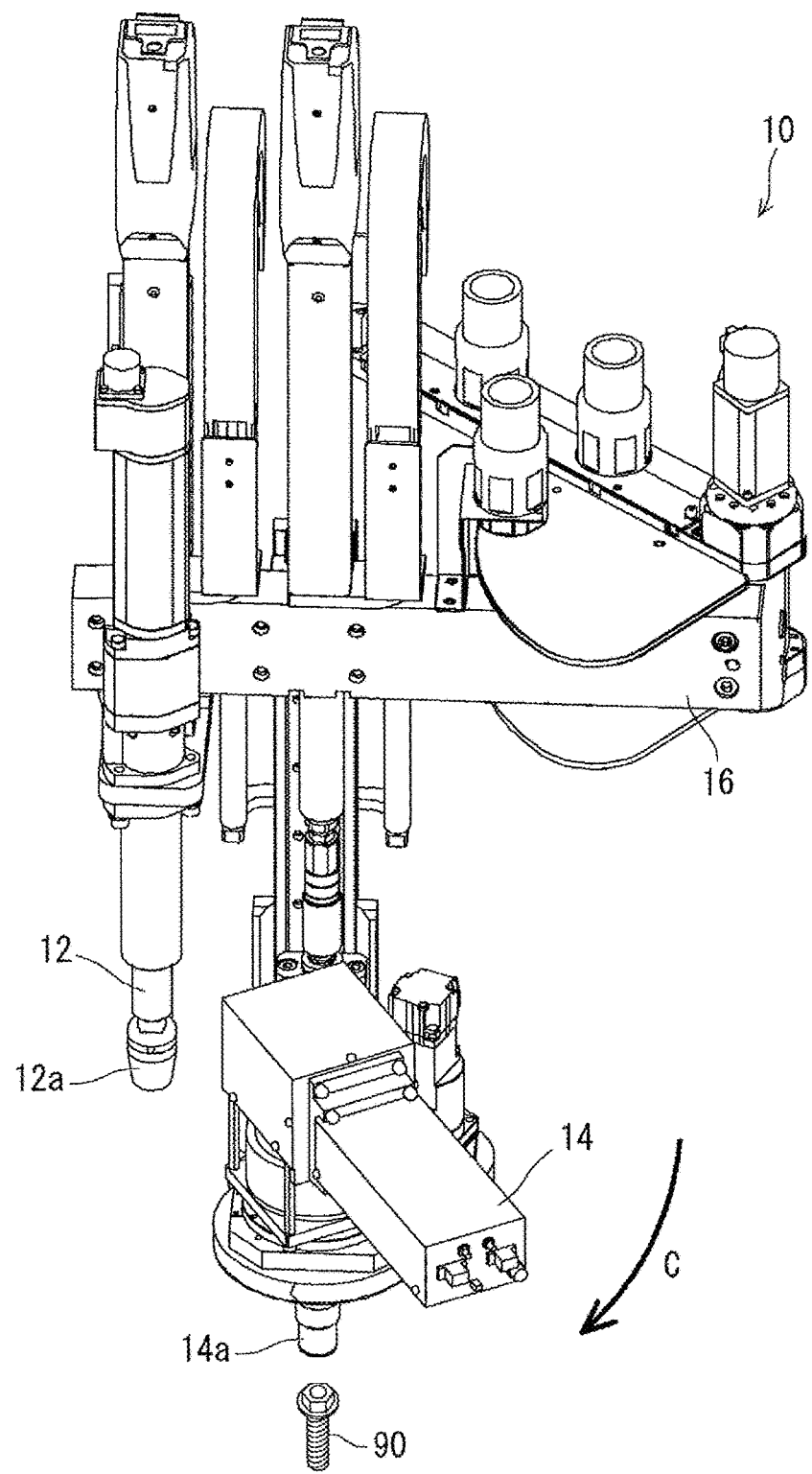
FIG. 9 is a view to describe the operation of the manipulator at the timing when final tightening is finished.

FIG. 9 is a view to describe the operation of the manipulator 16 at the timing when the final tightening is finished. As illustrated in FIG. 7, at the time when the final tightening is finished, the tip end 12a of the tightening machine 12 is opposed to the head 92 of the bolt 90. When the manipulator controller 160 receives a final tightening end signal, the manipulator controller 160 controls the manipulator 16 so that the tightening machine 12 retreats from a position opposed to the head 92 of the bolt 90 and the image sensor 14a of the distance sensor 14 is opposed to the head 92 of the bolt 90. At this time, the manipulator controller 160 controls the manipulator 16 to rotate the distance sensor 14 in accordance with the tightening angle b from a state illustrated in FIG. 8 (step S124). That is, the manipulator controller 160 rotates the distance sensor 14 so as to change a relative posture of the image sensor 14a relative to the head 92 in accordance with the tightening angle b. Hereby, as indicated by an arrow C in FIG. 9, the distance sensor 14 is set above the head 92 of the bolt 90 in a state where the distance sensor 14 is rotated only by the tightening angle b from the state of FIG. 8, that is, a state of the first timing. When the distance sensor 14 is set to a state illustrated in FIG. 9, the manipulator controller 160 outputs a set completion signal to the distance sensor controller 140.

Then, at a timing (a second timing) when the final tightening is finished, the bolt axial tension measuring apparatus 1 measures a recess amount of the head 92 of the bolt 90 by use of the distance sensor 14 (step S126). More specifically, when the distance sensor controller 140 receives the set completion signal, the distance sensor controller 140 controls the distance sensor 14 to generate a distance image of the head 92 at the timing when the final tightening is finished. Hereby, the distance sensor controller 140 acquires the distance image (a second distance image) of the head 92 at the timing when the final tightening is finished. Further, the distance sensor controller 140 measures a recess amount a2 (a second recess amount) of the head 92 at the timing when the final tightening is finished, as will be described later.

When the recess amount a2 is measured, the distance sensor controller 140 calculates a difference a2−a1 in the recess amount as a displacement amount Δa by the tightening of the bolt 90. Then, the distance sensor controller 140 measures an axial tension of the bolt 90 tightened to the to-be-tightened member 80 by use of the displacement amount Δa (=a2−a1) (step S128). More specifically, the distance sensor controller 140 calculates the axial tension of the bolt 90 by use of the axial tension conversion curve exemplified in FIG. 5, a conversion formula corresponding to the axial tension conversion curve, or the like, and the displacement amount Δa. Note that the control device 100 may evaluate validity of the axial tension thus measured, by use of the target axial tension set in S106.

In the present embodiment, as described above, after the temporary tightening, the manipulator 16 causes the tightening machine 12 to retreat from the position opposed to the head 92 of the bolt 90, and then opposes the distance sensor 14 to the head 92. Then, after the final tightening, the manipulator 16 causes the tightening machine 12 to retreat from the position opposed to the head 92 of the bolt 90, and then opposes the distance sensor 14 to the head 92. Accordingly, the bolt axial tension measuring apparatus 1 according to the present embodiment can automatically measure an axial tension of the bolt 90 after the final tightening.

Next will be described a measuring method (S114, S126) of a recess amount. The recess amount is measured by calculating a difference between a distance from a bottom portion (a valley) of the head 92 of the bolt 90 and a top portion (a mountain) thereof, based on a distance image. That is, the recess amount corresponds to a difference between a height of the bottom portion (the valley) of the head 92 of the bolt 90 and the top portion (the mountain) thereof. The following describes a method for calculating the height of the bottom portion and the height of the top portion.

Note that a pixel value in the distance image may be larger as a distance to the distance sensor 14 is larger, or may be smaller as the distance to the distance sensor 14 is larger. In a case where the pixel value is larger as the distance to the distance sensor 14 is larger, a pixel having a large pixel value indicates a position where the height is low in the head 92. Further, in a case where the pixel value is smaller as the distance to the distance sensor 14 is larger, a pixel having a large pixel value indicates a position where the height is high in the head 92. That is, the pixel value can indicate a distance from the distance sensor 14 to a position corresponding to the pixel and can indicate a height of the position.

Figure 10A:
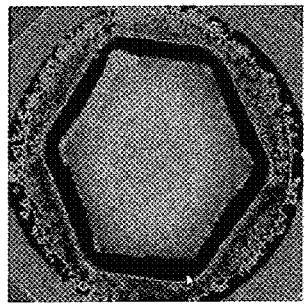
FIG. 10A is a view to describe a method for calculating a height of a bottom portion of the head of the bolt by use of a distance image, and illustrates an original picture of a distance image corresponding to a head 92 of a bolt 90.
Figure 10B:
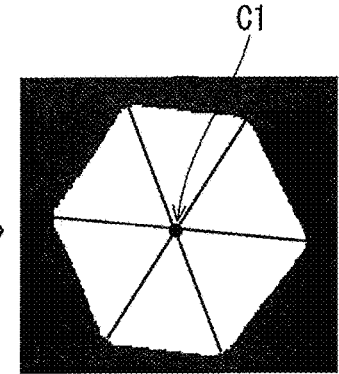
FIG. 10B is a view to describe the method for calculating the height of the bottom portion of the head of the bolt by use of the distance image, and a view to extract the head 92 of the bolt 90.
Figure 10C:
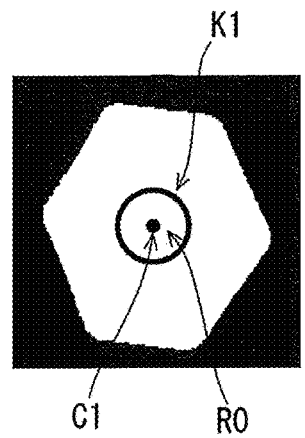
FIG. 10C is a view to describe the method for calculating the height of the bottom portion of the head of the bolt by use of the distance image.

FIGS. 10A, 10B, 10C are views to describe a method for calculating the height of the bottom portion of the head 92 of the bolt 90 by use of a distance image. FIG. 10A illustrates an original picture of the distance image corresponding to the head 92 of the bolt 90. The distance sensor controller 140 performs a binarization process, a labelling process, and the like with respect to the distance image illustrated in FIG. 10A, so as to extract the head 92 of the bolt 90 as illustrated in FIG. 10B. The binarization process is performed such that pixel values in the distance image are categorized into two colors (e.g., black and white, or the like) depending on whether or not each of the pixel values is a predetermined threshold or more. In the example illustrated in FIG. 10B, if a pixel value indicates that a height is higher than the predetermined threshold (i.e., a pixel value indicates that a distance from the distance sensor 14 is closer than the predetermined threshold), its pixel is classified to white, and if not, the pixel is classified to black. Further, the labelling process is a process of assigning the same number to continuous pixels having the same pixel values and separating pixels by color depending on the numbers assigned thereto. Due to the labelling process, it is possible to restrain a part with a measurement result that its height is higher than its actual height (that is, closer to the distance sensor 14) by dust or the like from being wrongly recognized as a part of the bolt 90. Due to the above processes, the distance sensor controller 140 can recognize a white part illustrated in FIG. 10B as the head 92 of the bolt 90.

In the image of the head 92 of the bolt 90 as illustrated in FIG. 10B, the distance sensor controller 140 connects opposed vertices of the hexagonal shape to each other by line segments, and calculates an intersection point of the line segments as a gravitational center position C1 of the head 92. Note that it is not necessary to connect the vertices by three line segments, and an intersection point of two straight lines may be taken as the gravitational center position C1. Further, in a case where three line segments do not cross each other at one point, a gravitational center of a triangular shape with three intersection points being taken as vertices may be taken as the gravitational center position C1.

Then, the distance sensor controller 140 takes an average value of pixel values of pixels in a region R0 in a circle K1 with a radius r1 around the gravitational center position C1, as a distance to the bottom portion (the valley) of the head 92, that is, a height h1 of the bottom portion. For example, the radius r1 is 2.5 mm, but is not limited to this. The radius r1 can be determined appropriately depending on a size and a shape of the head 92 of the bolt 90 (a size or the like of a recessed portion such as a hexagon socket originally formed in the head 92).

Figure 11:
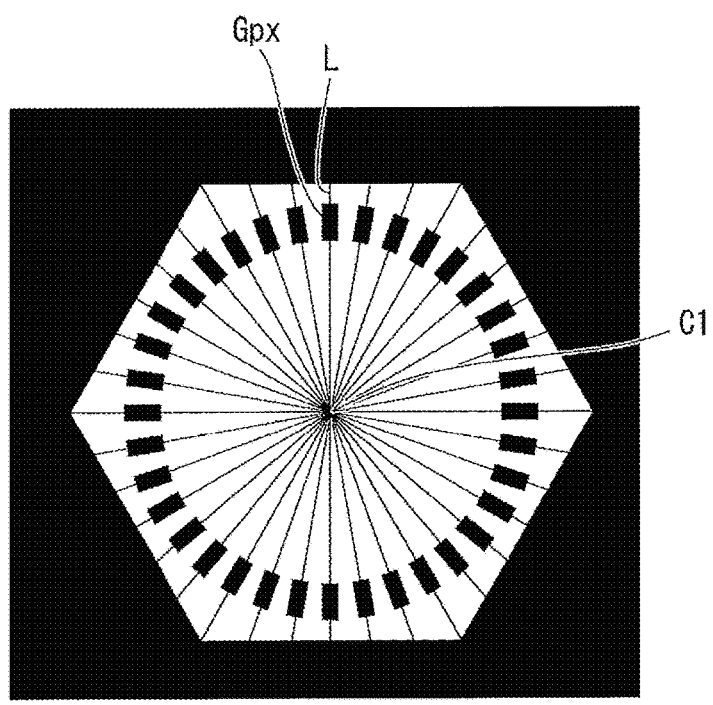
FIG. 11 is a view to describe a method for calculating a height of a top portion of the head of the bolt by use of a distance image.

FIG. 11 is a view to describe a method for calculating the height of the top portion of the head 92 of the bolt 90 by use of the distance image. The distance sensor controller 140 extracts a predetermined number (e.g., 10) of pixels placed at relatively high positions from among pixels placed on each of a plurality of virtual straight lines L extending radially at a uniform angle (e.g., 0.5 degrees) from the gravitational center position C1. For example, in a case where the pixel value is smaller as the distance to the distance sensor 14 is larger, the distance sensor controller 140 extracts ten pixels having relatively large pixel values. Further, for example, in a case where the pixel value is larger as the distance to the distance sensor 14 is larger, the distance sensor controller 140 extracts ten pixels having relatively small pixel values.

Then, the distance sensor controller 140 determines an average value of the pixels thus extracted (720×10=7200 pixels, in the example) as a distance to the top portion (the mountain) of the head 92, that is, a height h2 of the top portion. Hereby, the distance sensor controller 140 calculates, as a recess amount, a difference between the height h1 of the bottom portion and the height h2 of the top portion. Note that this process is the same in the case of the process of S114 and in the case of the process of S126.

Note that, generally, a part to be deformed by the axial tension is a part near a center of the head 92 of the bolt 90, that is, a part near the gravitational center position C1, and a part near an outer edge of the head 92 does not deform due to the axial tension. Accordingly, both at the timing of the temporary tightening (before the final tightening) and at the timing of the final tightening (after the final tightening), the top portion exists in the vicinity of the outer edge of the head 92. An actual height of the top portion of the head 92 does not change before and after the final tightening of the bolt 90. Further, among pixels on each of the virtual straight lines L, pixels (that is, pixels corresponding to the top portion) each having a pixel value indicating that the height is high can be adjacent to each other at a position, on the distance image, corresponding to the vicinity of the outer edge of the head 92. A pixel group Gpx illustrated in FIG. 11 indicates a group of top ten pixels having a pixel value indicating that the height is high, among pixels on each of the virtual straight lines L. In the pixel group Gpx, the top ten pixels having a pixel value indicating that the height is high are adjacent to each other. Further, although depending on a shape of the head 92, a set of pixel groups Gpx1, that is, a set of pixels corresponding to the top portion generally forms a ring shape along the vicinity of the outer edge of the head 92.

Note that, since the bolt 90 is screwed by the tightening of the bolt 90, a distance between the distance sensor 14 (the image sensor 14a) and the head 92 in the final tightening is longer than a distance between the distance sensor 14 (the image sensor 14a) and the head 92 in the temporary tightening. Accordingly, an actual height of the top portion of the head 92 does not change before and after the final tightening of the bolt 90, but it should be noted that pixel values of pixels (the pixel group Gpx) corresponding to the top portion on the distance image change before and after the final tightening according to a depth to which the bolt 90 is screwed. This also applies to the bottom portion.

Here, in the present embodiment, the distance sensor 14 (the image sensor 14a) also rotates only by an angle by which the bolt 90 rotates due to the tightening of the bolt 90 at the time of the final tightening. Accordingly, an orientation of an image corresponding to the head 92 of the bolt 90, extracted from the distance image, is the same at the timing of the temporary tightening and at the timing of the final tightening. Hereby, a position of the head 92 corresponding to the pixels extracted in the process illustrated in FIG. 11 (positions of the pixels corresponding to the top portion) is the same at the timing of the temporary tightening and at the timing of the final tightening.

Comparative Example

Figure 12A:
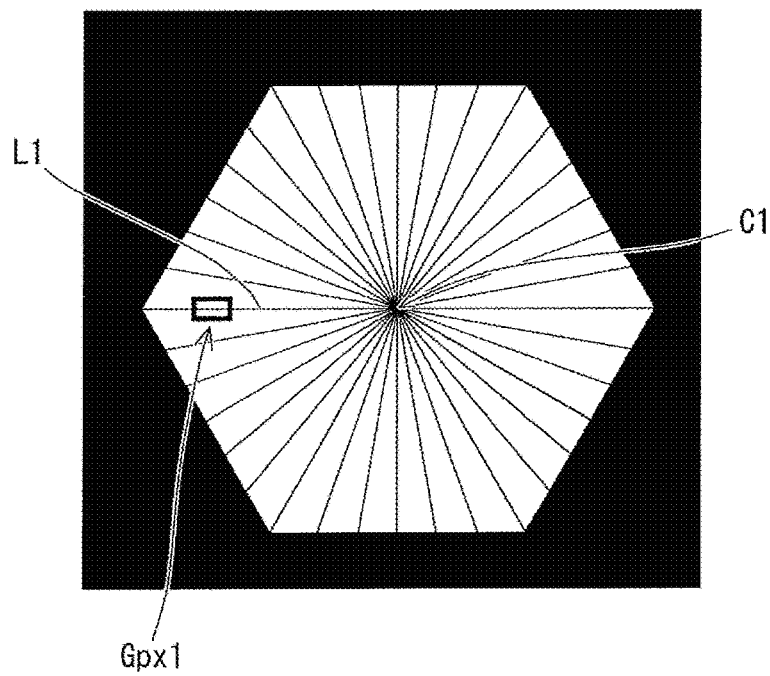
FIG. 12A is a view illustrating a distance image according to a comparative example and is a view illustrating a distance image of a head 92 of a bolt 90, acquired at a timing of temporary tightening.
Figure 12B:
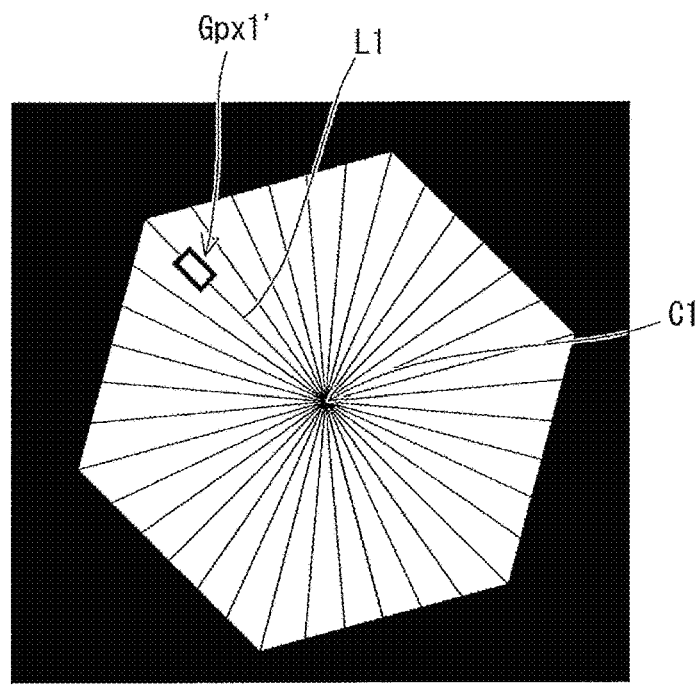
FIG. 12B is a view illustrating a distance image according to the comparative example and is a view illustrating a distance image of the head 92 of the bolt 90, acquired at a timing of final tightening.

The following describes a comparative example. The comparative example is different from Embodiment 1 in that a distance sensor 14 is not rotated in accordance with a tightening angle b. FIGS. 12A and 12B are views illustrating distance images according to the comparative example. Note that the distance images illustrated in FIGS. 12A, 12B correspond to the distance image illustrated in FIG. 11. FIG. 12A is a view illustrating a distance image of a head 92 of a bolt 90, acquired at the timing of temporary tightening. FIG. 12B is a view illustrating a distance image of the head 92 of the bolt 90, acquired at the timing of final tightening. In the example of FIG. 12B, the bolt 90 rotates clockwise by 45 degrees from the temporary tightening to the final tightening. That is, in the example of FIG. 12B, a tightening angle b is 45 degrees. Accordingly, as illustrated in FIG. 12B, the distance image of the head 92 of the bolt 90, acquired at the timing of the final tightening, rotates clockwise by 45 degrees relative to the distance image of the head 92 of the bolt 90, acquired at the timing of the temporary tightening.

Here, a position, in the head 92 of the bolt 90, corresponding to a pixel group Gpx1 in the distance image illustrated in FIG. 12A, corresponds to a pixel group Gpx1' in FIG. 12B. Note that the pixel group Gpx1 and the pixel group Gpx1' correspond to the pixel group Gpx illustrated in FIG. 11, and accordingly correspond to a top portion. Further, the pixel group Gpx1 and the pixel group Gpx1' are each constituted by ten pixels. Since the tightening angle b of the bolt 90 is 45 degrees, the pixel group Gpx1' has an orientation rotated clockwise around a gravitational center position C1 by 45 degrees relative to the pixel group Gpx1.

Figure 13:
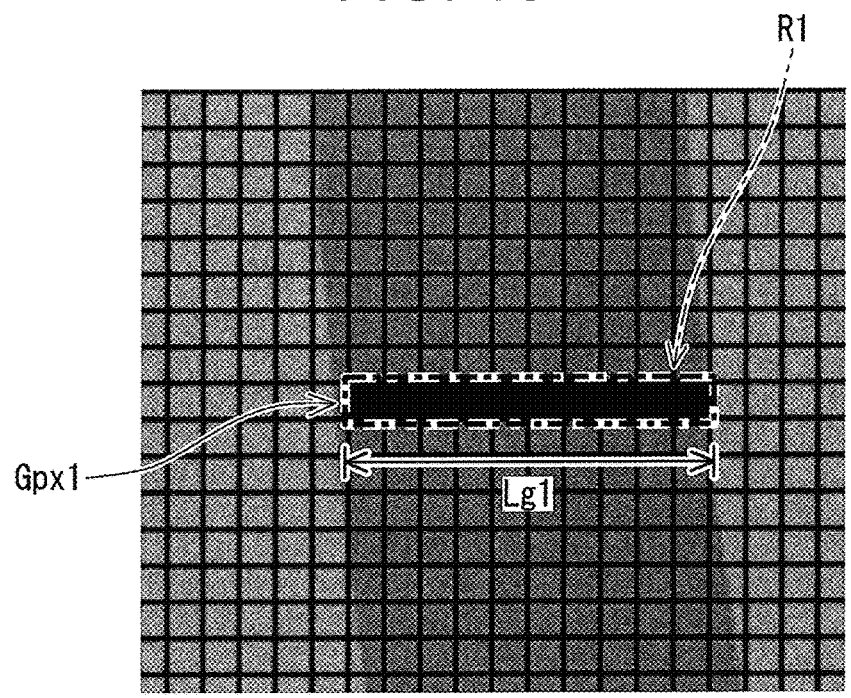
FIG. 13 is a view illustrating a pixel group Gpx1 illustrated in FIG. 12A.

FIG. 13 is a view illustrating the pixel group Gpx1 illustrated in FIG. 12A. As described above, the pixel group Gpx1 is constituted by ten pixels. Further, the pixel group Gpx1 is configured such that the pixels are arranged generally in a horizontal direction. Further, a position corresponding to the pixel group Gpx1 is referred to as a region R1 surrounded by an alternate long and short dash line. In FIG. 13, the pixel group Gpx1 and the region R1 generally overlap with each other. Further, a length of the pixel group Gpx1 in a longitudinal direction (the horizontal direction) is referred to as Lg1.

Figure 14:
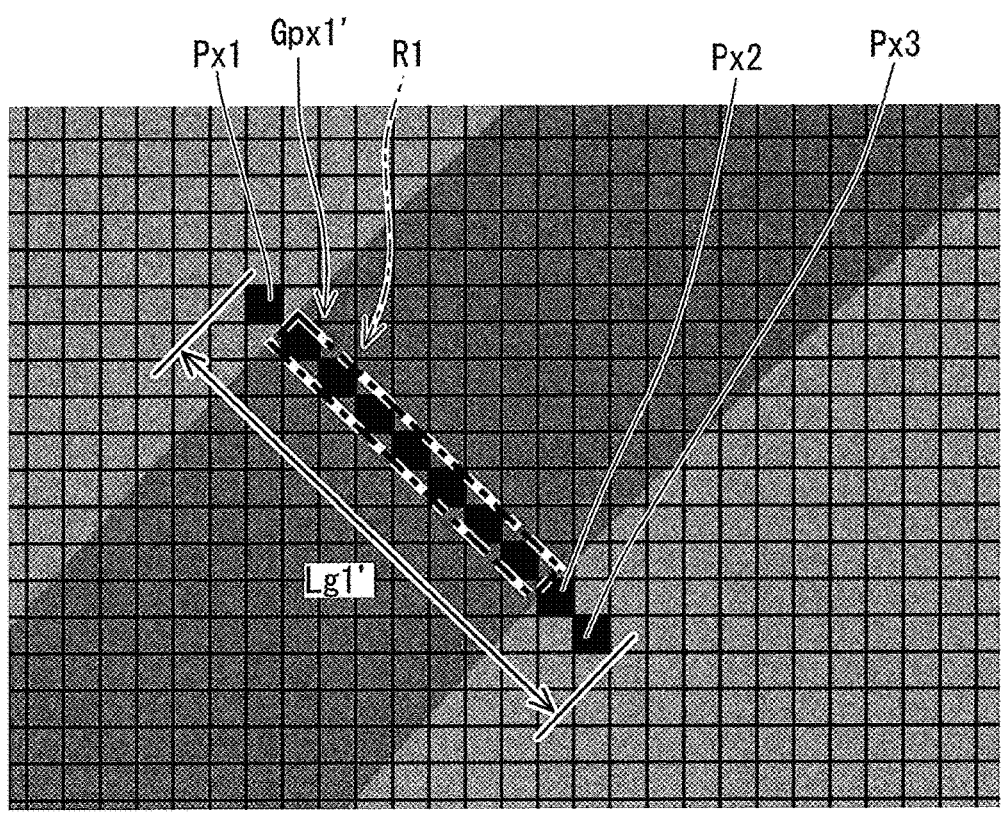
FIG. 14 is a view illustrating a pixel group Gpx1' illustrated in FIG. 12B.

FIG. 14 is a view illustrating the pixel group Gpx1' illustrated in FIG. 12B. As described above, the pixel group Gpx1' is constituted by ten pixels. Further, the pixel group Gpx1' is configured such that the pixels are arranged in a diagonally 45-degree direction. Here, a shape of a pixel is a square shape in general, and therefore, a length of the pixel in a diagonal direction is longer than a length thereof in the horizontal direction (and a vertical direction). Accordingly, a length Lg1' of the pixel group Gpx1' in a longitudinal direction is longer than the length Lg1 of the pixel group Gpx1. Accordingly, some pixels constituting the pixel group Gpx1' protrude from the region R1 indicative of a position corresponding to the pixel group Gpx1.

Here, pixels Px1, Px2, and Px3 protruding from the region R1 do not correspond to the position of the head 92 corresponding to the region R1. In other words, pixel values of the pixels Px1, Px2, and Px3 do not indicate the height of the position of the head 92 (a distance to this position) corresponding to the region R1. Accordingly, a difference between an average value of the pixel values of the pixels constituting the pixel group Gpx1 and an average value of the pixel values of the pixels constituting the pixel group Gpx1' might not correspond to a depth to which the bolt 90 is screwed from the temporary tightening to the final tightening. Hereby, in the comparative example, it might be difficult to calculate a recess amount a2 after the final tightening accurately. That is, in the comparative example, the positions of the pixels corresponding to the top portion might be different between the timing of the temporary tightening and the timing of the final tightening, and therefore, a displacement amount Δa cannot be calculated accurately, so that an axial tension of the bolt 90 might not be able to be measured accurately.

In the meantime, in the present embodiment, the distance image is acquired at the timing of the final tightening such that the distance sensor 14 is rotated in accordance with the tightening angle b. In other words, in the example illustrated in FIG. 12A, the distance image acquired after the final tightening might be the distance image illustrated in FIG. 12A. Further, in other words, respective postures of images corresponding to the head 92 of the bolt 90, illustrated in respective distance images after the temporary tightening and after the final tightening can be the same. Accordingly, the positions of the pixels corresponding to the top portion can be the same at the timing of the temporary tightening and at the timing of the final tightening. Thus, the bolt axial tension measuring apparatus 1 according to the present embodiment can calculate the displacement amount Δa accurately, so that the axial tension of the bolt 90 can be measured accurately.

Modification

Note that the disclosure is not limited to the above embodiment, and various modifications can be made within a range that does not deviate from the gist of the disclosure. For example, the order of the steps in the flowchart illustrated in FIG. 6 is modifiable appropriately. Further, more than one steps are omissible. Further, other steps may be executed while a given step is executed.

For example, in FIG. 6, after the process of S114 is finished, the process of S116 starts. However, after the temporary tightening is finished (after S112), the final tightening may be started while the process of S114 is executed (that is, during the measurement process of the recess amount a1). Hereby, a process time of the whole flowchart illustrated in FIG. 6 can be shortened.

Further, in the flowchart illustrated in FIG. 6, the distance sensor 14 is rotated (S122, S124) after the final tightening is finished (S120), but is not limited to such a configuration. While the tightening machine 12 tightens the bolt 90, the manipulator controller 160 may rotate the distance sensor 14 in conjunction with the rotation of the tip end 12a of the tightening machine 12 along with the tightening. Hereby, when the final tightening is finished and the distance sensor 14 is opposed to the head 92 of the bolt 90, the distance sensor 14 is rotated only by an angle according to the tightening angle b. This accordingly makes it possible to shorten the process time.

Further, in the above embodiment, the distance sensor 14 is rotated in accordance with the tightening angle b, but is not limited to such a configuration. Not the distance sensor 14 itself, but only the image sensor 14a may be rotated. Note that, naturally, even in a case where the distance sensor 14 is rotated, the image sensor 14a rotates relative to the head 92 of the bolt 90.

Further, in the above embodiment, the distance sensor 14 is rotated only by the tightening angle b, but is not limited to such a configuration. The distance sensor 14 may be rotated by (b−360*n) degrees (n is an integer other than 0). According to such a method, in a case where the tightening angle b is 360 degrees or more, it is possible to reduce a rotation angle of the distance sensor 14.

Further, in a case where the shape of a pixel is a square shape, the distance sensor 14 may be rotated by (b+90*m) degree (m is an integer other than 0). Note that the clockwise direction is assumed a positive direction. Then, the distance sensor controller 140 may rotate the distance image acquired after the final tightening by −90*m degrees. Hereby, for example, in a case of b=60 degrees, the distance sensor 14 may be rotated by 60−90=−30 degrees as m=−1. The distance sensor controller 140 may rotate the distance image acquired after the final tightening by 90 degrees. In this case, the rotation angle of the distance sensor 14 is reduced. In the meantime, when the distance sensor 14 is rotated only by the same angle as the tightening angle b, it becomes unnecessary to rotate the distance image. Accordingly, the process of measurement of the axial tension can be simplified.

Further, in the above embodiment, the shape of the pixels constituting the distance image is a square shape, but the shape of the pixels is not limited to a square shape. For example, the pixels may have a rectangular shape or a hexagonal shape.

Further, in the above embodiment, the distance sensor 14 is rotated, but the to-be-tightened member 80 to which the bolt 90 is tightened may be rotated. Further, the distance sensor 14 and the to-be-tightened member 80 may be rotated. That is, a relative posture of the image sensor 14a relative to the head 92 of the bolt 90 should be changed in accordance with the tightening angle b.

What is claimed is:

1. A bolt axial tension measuring apparatus for measuring an axial tension of a bolt tightened to a to-be-tightened member, the bolt axial tension measuring apparatus comprising:

a tightening machine configured to threadedly engage the bolt with the to-be-tightened member, so as to tighten the bolt to the to-be-tightened member;

a distance sensor configured to measure a distance to a head of the bolt and to acquire a distance image in which the distance thus measured is indicated by a pixel value;

a controlling portion configured to control a relative posture of an image sensor of the distance sensor relative to the head of the bolt; and a measuring portion configured to measure a recess amount of the head of the bolt by use of the distance image and to measure an axial tension of the bolt, wherein at a first timing when the tightening machine temporarily tightens the bolt, the distance sensor is configured to acquire a first distance image and the measuring portion is configured to measure a first recess amount of the head of the bolt at the first timing by use of the first distance image;

the controlling portion is configured to change the relative posture of the image sensor relative to the head of the bolt in accordance with a rotation angle by which the bolt is rotated from the first timing to a second timing when the tightening machine further tightens the bolt as compared to the first timing; and at the second timing, the distance sensor is configured to acquire a second distance image and the measuring portion is configured to measure a second recess amount of the head of the bolt at the second timing by use of the second distance image, so as to measure the axial tension of the bolt by use of a difference between the first recess amount and the second recess amount.

2. The bolt axial tension measuring apparatus according to claim 1, wherein:

the second timing is a timing of final tightening of the bolt;

at the first timing, the tightening machine is configured to tighten the bolt with a first torque corresponding to the temporary tightening of the bolt, and then retreat from a position opposed to the bolt, and the controlling portion is configured to control a posture of the distance sensor so that the image sensor is opposed to the head of the bolt; and at the second timing, the tightening machine is configured to tighten the bolt with a second torque corresponding to the final tightening of the bolt, and then retreat from the position opposed to the bolt, and the controlling portion is configured to control the posture of the distance sensor so that the image sensor is opposed to the head of the bolt.

3. The bolt axial tension measuring apparatus according to claim 1, wherein the controlling portion is configured to rotate the image sensor relative to the head of the bolt or to rotate, to the image sensor, the to-be-tightened member to which the bolt is tightened, by the same angle as the rotation angle by which the bolt rotates from the first timing to the second timing.

4. A bolt axial tension measuring method for measuring an axial tension of a bolt tightened to a to-be-tightened member, the bolt axial tension measuring method comprising:

measuring a first recess amount of a head of the bolt at a first timing by use of a first distance image acquired at the first timing by a distance sensor configured to measure a distance to the head of the bolt so as to acquire a distance image in which the distance thus measured is indicated by a pixel value, the first timing being a timing when a tightening machine temporarily tightens the bolt, the tightening machine being configured to threadedly engage the bolt to the to-be-tightened member so as to tighten the bolt to the to-be-tightened member;

changing a relative posture of an image sensor of the distance sensor relative to the head of the bolt in accordance with a rotation angle by which the bolt is rotated from the first timing to a second timing when the tightening machine further tightens the bolt as compared to the first timing;

measuring a second recess amount of the head of the bolt at the second timing by use of a second distance image acquired by the distance sensor at the second timing; and measuring the axial tension of the bolt by use of a difference between the first recess amount and the second recess amount.

* * * * *